United States Patent [19]
Judkins

[11] Patent Number: 4,459,736
[45] Date of Patent: Jul. 17, 1984

[54] SHIM FOR ELECTRICAL RECEPTACLE OR SWITCH

[76] Inventor: Milton W. Judkins, 4606 Birch, Bellaire, Tex. 77401

[21] Appl. No.: 371,563

[22] Filed: Apr. 26, 1982

[51] Int. Cl.[3] .......................... B23P 19/00; H02B 1/02
[52] U.S. Cl. .............................. 29/526 R; 339/133 R
[58] Field of Search ........................ 174/55, 53, 58, 61, 174/63, 66; 248/27.1; 29/526 R; 339/132 R, 132 B, 133 R

[56] References Cited

U.S. PATENT DOCUMENTS 1,992,059 2/1935 Despard .......................... 339/133 R
2,029,716 2/1936 Hartmann ........................ 339/133 R
2,788,187 4/1957 Cookson et al. .................. 248/27.1
3,403,217 9/1968 Drapkin .......................... 339/132 R
3,662,085 5/1972 Robinson et al. .................. 248/27.1
3,689,864 9/1972 Glader ............................ 339/133 R

*Primary Examiner*—Howard N. Goldberg
*Assistant Examiner*—Steven E. Nichols
*Attorney, Agent, or Firm*—Arnold, White & Durkee

[57] ABSTRACT

A shim for adjusting the fit of an electrical receptacle, switch or the like with the exposed surface of the surrounding wall is disclosed. The shim most preferably comprises a generally C-shaped piece of rigid material having a plurality of shimming and connecting surfaces defining a central opening. Most preferably the shim is characterized by two diametrically located shimming surfaces having concave interior edges and connected by a single connecting surface. This configuration provides shimming surfaces having increased shimming areas, while provided a shim which is easily installed and adjusted.

2 Claims, 4 Drawing Figures

SHIM FOR ELECTRICAL RECEPTACLE OR SWITCH

BACKGROUND OF THE INVENTION

1. Field of the Invention

This invention relates generally to a device for use in shimming an electrical receptacle, switch or similar fixture, especially such a fixture previously installed in an outlet box behind a wall surface. More particularly, a shim, both simple to manufacture and easy to use, most preferably constructed of a single piece of rigid, generally C-shaped material for shimming previously installed electrical fixtures is disclosed.

2. Description of the Background

The basic configuration of electrical receptacles, switches or similar fixtures has remained unchanged for over half a century. During that time, the methods of installation of these fixtures have also remained virtually unchanged.

In general, the outlet boxes and required wiring are installed on studs after framing but before installation of the walls. Gypsum board, paneling or the like is then installed with a hole approximately the required size for the electrical fixture being cut therein. The fixture is then installed in the outlet box and secured against the exposed wall surface prior to final attachment of a receptacle cover, switch plate or the like.

Particularly in large scale commercial installation, it has been found that it is commercially advantageous to depart from the above installation procedure by having the electrician install the electrical fixture in the outlet box at the time the initial wiring is performed. Accordingly, the electrical fixtures are installed prior to installation of the gypsum board, paneling or other wall material. Using this construction technique, the pre-installed electrical fixture is withdrawn from the outlet box through the appropriate hole in the affixed wall material and then secured in place.

Using either method, but with greater frequency when the electrical fixture is pre-installed, the hole in the wall surface may be too large or inexactly placed to provide a surface to which the fixture may be securely engaged. With standard electrical fixtures, the wall surface surrounding the hole may provide little or no support for one or both of the mounting arms. Accordingly, the fixture could not be securely mounted against the wall surface. Numerous makeshift shimming means are used to solve this problem. These means include the use of washers placed around the mounting screws and behind the mounting prongs to provide the additional required shimming to permit the fixture to be securely affixed. Other means of shimming these fixtures include the use of tubing cut to the appropriate length or the wrapping of wire around the mounting screws and behind the mounting prongs to produce the desired shimming with the outlet box.

These crude solutions, time consuming to fashion and install, provide only marginally satisfactory results. With the increased use of construction techniques employing pre-installed electrical fixtures, this problem is occurring with alarming frequency. Accordingly, a shim both inexpensively manufactured and easily used has been long sought by the art to solve this problem.

SUMMARY OF THE INVENTION

The shim of the present invention overcomes the disadvantages of the makeshift devices described above and provides an inexpensively manufactured, easily used, yet reliable shim for adjusting the fit of an electrical receptacle, switch or similar fixture with the surrounding wall surface. Hereinafter, "electrical receptacle" shall be used to mean electrical receptacle, switch, or any similar electrical fixture meant to be generally flush mounted in a wall, ceiling or floor.

The present invention provides a simple shim which in a preferred embodiment is easily and conveniently manufactured from a single piece of rigid material, such as 16–20 gauge sheet metal or rigid plastic.

The shim of the present invention comprises in its simplest embodiment, a shim of such size, shape and thickness to fit behind and be concealed by a receptacle cover or switch plate. This shim comprises a plurality of rigid shimming surfaces, preferably two such surfaces for use with standard electrical receptacles, suitable for contacting at least a portion of the mounting arms of the receptacle. This shim further comprises at least one connecting surface, preferably only one connecting surface, to connect the shimming surfaces. Finally, the shim of the present invention is characterized by having an opening therein generally bounded by the shimming and connecting surfaces. This opening is of sufficient size and shape to receive therethrough the main body of the receptacle but not of sufficient size and shape to receive therethrough the entirety of the mounting arms when the shim and receptacle are positioned in substantially parallel alignment. In a preferred embodiment the shim of the present invention comprises a generally C-shaped piece of rigid material. Accordingly, a single shimming device may be used to properly shim a standard electrical receptacle at each of its two mounting arms.

The shim of the present invention is characterized in a more preferred embodiment by having two diametrically located shimming surfaces connected by one connecting surface. At least a portion of the interior edges of the diametrically located shimming surfaces are spaced apart by a distance greater than the distance between the mounting means of the electrical receptacle. Preferably at least a portion of these edges are concave to the shimming surfaces. Most preferably the radius of curvature of these concave edges is greater than one-half the distance between the diametrically located mounting means of the associated receptacle.

The shim of the present invention has many advantages. It is easily and inexpensively manufactured and used. It is particularly advantageous for use with pre-installed electrical fixtures. It is removable and reusable. This shim provides for efficient, convenient, reliable and secure installation of electrical receptacles or the like. These and other meritorious features and advantages of the present invention will be more fully appreciated from the following detailed description and claims.

While the invention will be described in connection with the preferred embodiment, it will be understood that it is not intended to limit the invention to that embodiment. On the contrary it is intended to cover all alternatives, modifications and equivalents as may be included within the spirit of the invention as defined in the appended claims.

DETAILED DESCRIPTION OF THE PREFERRED EMBODIMENT

Figure 1:
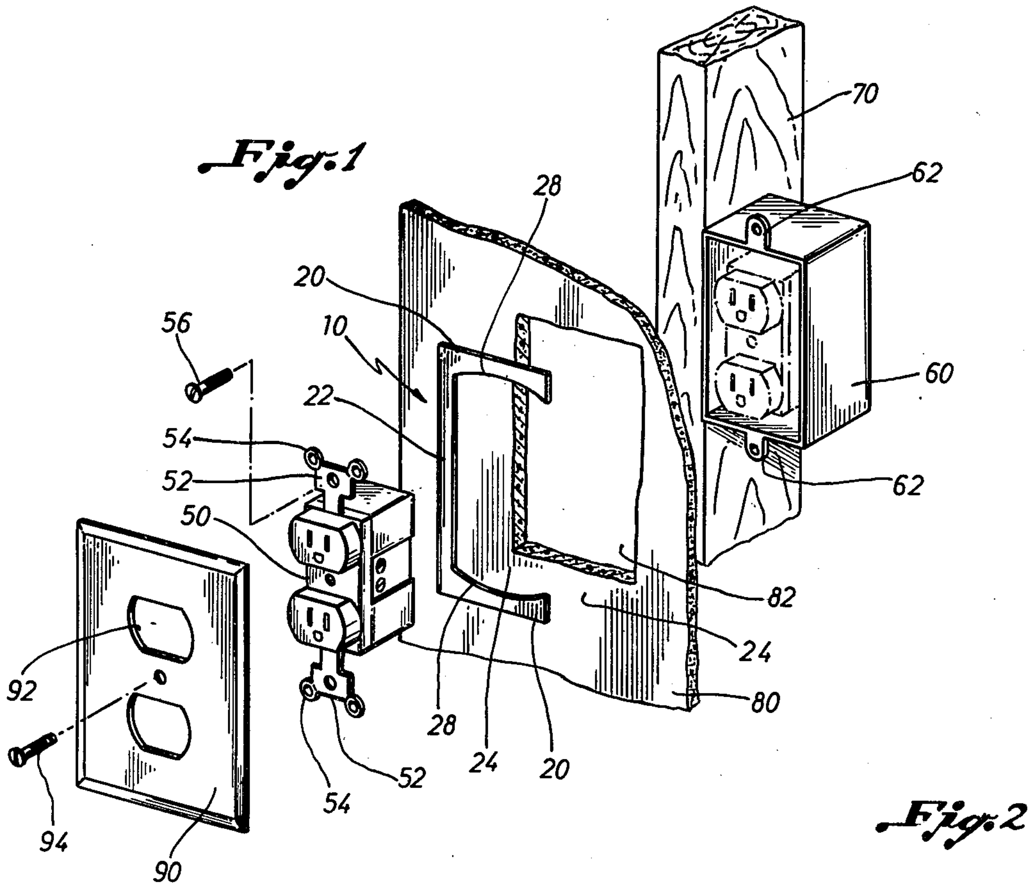
FIG. 1 is a perspective drawing of the preferred embodiment of the shim of the present invention in its intended environment of use. This figure illustrates the shim and its intended environment of use in an exploded view illustrating the installation layers and the electrical receptacle ghosted in its installed position.
Figure 2:
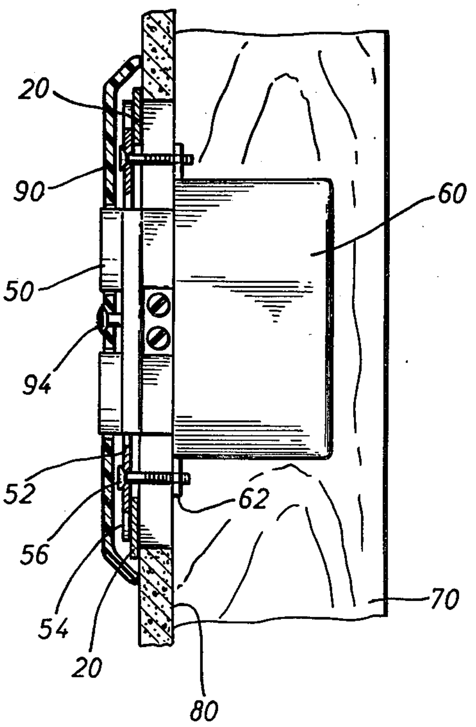
FIG. 2 is a cross-sectional side view illustrating the shim of the present invention in its intended environment of use.

The shim 10 of the present invention is useful for adjusting the fit of an electrical receptacle 50, switch or other similar electrical fixture with the exposed surface of the surrounding wall 80. In the most preferred embodiment, illustrated in FIG. 1, shim 10 is formed from a single, thin piece of rigid sheet material, preferably galvanized steel. However, shim 10 may be manufactured from any suitable material providing sufficiently rigid shimming surfaces, such as sheet metals, rigid plastics or the like.

The shim of the present invention comprises a shim 10 of such size, shape and thickness to fit behind and be concealed by a receptacle cover 90, switch plate or the like. Generally, the overall configuration of shim 10 will be that of a flat, rectangular shimming device to be concealed behind a standard receptacle cover 90 or switch plate. However, the overall shape and size of shim 10 is not significant except that aesthetically it must be concealable behind cover 90.

Standard electrical fixtures such as receptacle 50 are installed to outlet box 60 at fixture attachment tabs 62 using mounting screws 56 through mounting arms 52, including breakaway tabs 54. Outlet box 60 is attached to stud 70, the floor, ceiling or the like using screws, bolts or other conventional means.

Receptacle 50 is secured against the exposed surface of a wall 80 such as gypsum board located between mounting prongs 52 and outlet box 60. Receptacle 50 is positioned through a fixture opening 82 in wall 80. In an ideal installation prongs 52 and breakaway tabs 54 are securely affixed against the exterior surface of wall 80 or the like when screws 56 are tightened. However, in many installations fixture opening 82 is irregular, oversized or improperly positioned. In such installations, one or both of mounting arms 52 and breakaway tabs 54 may not securely contact wall 80 or the like. In these installations receptacle 50 cannot be securely installed at the exposed surface of the wall 80, but remains loose or affixed at a recessed location. Accordingly, a shimming device is required. The present invention provides a shim 10 which permits electrical receptacle 50 to be securely engaged in place.

Shim 10 is characterized by a plurality of rigid shimming surfaces 20. Shimming surfaces 20 are suitable for contacting at least a portion of mounting arms 52 of electrical receptacle 50, switch or similar electrical fixture. Shim 10 of the present invention is further characterized by at least one connecting surface 22 to connect shimming surfaces 20. Connecting surfaces 22 need not be rigid. Shimming surfaces 20 and connecting surfaces 22 further define a central opening 24 of sufficient size and shape to receive therethrough the main body of receptacle 50, but not of sufficient size and shape to receive therethrough the entirety of mounting arms 52 when shim 10 and receptacle 50 are positioned in substantially parallel alignment.

In a more preferred embodiment connecting surfaces 22 are rigid and are constructed of the same material as shimming surfaces 20. In fact, the entirety of shim 10 including shimming surfaces 20 and connecting surface 22 are preferably formed from a single piece of rigid material such as sheet metal or rigid plastic. However, connecting surfaces 22 need not be of the same material as shimming surfaces 20 and need not even be of a rigid material.

Figure 4:
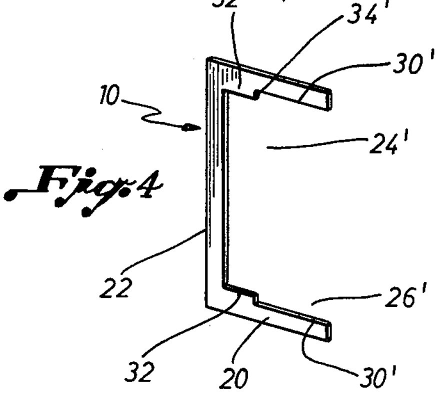
FIG. 4 is a perspective drawing of an alternative embodiment of the shim of the present invention, illustrating a shim with non-curved shimming surfaces.

Another embodiment of shim 10′ comprises two diametrically located shimming surfaces 20 to provide an easily manufactured and used shim for standard electrical receptacles 50 having two diametrically located mounting arms. This embodiment is illustrated in FIG. 4. In this embodiment at least a portion of the interior edges 30′ are spaced apart by a distance greater than the distance between mounting means, such as mounting screws 56, of receptacle 50 or the like. In order to provide a shimming surface of greater area, a portion 32′ of shimming surface 20′ may be spaced apart less than the distance between mounting screws 56 but sufficient to permit passage of the main body of receptacle 50 therethrough. An additional feature of this embodiment is edge stop 34′ which is used to easily position the shim when installing shim 10′ around electrical receptacle 50 by abutment of stop 34′ against mounting screws 56.

In a preferred embodiment of the present invention at least a portion of the interior edge of shimming surface 20 is concave as at 28. More preferably the radius of curvature of concave edge 28 is just greater than one-half the distance between the diametrically located mounting means of electrical receptacle 50 such as screws 56. Alternatively, the radius of curvature of concave interior edge 28 of any particular shimming surface 20 is just greater than the distance between the center of electrical receptacle 50 and the associated mounting means, such as mounting screw 56. Because mounting prongs 52 project further from electrical receptacle 50 than the position of mounting screw 56, at least a portion of mounting prongs 52, including breakaway tabs 54 contacts shimming surface 20 which in turn contacts the exposed surface of wall 80 or the like to provide the desired shimming action.

In a more preferred embodiment of the present invention shim 10 includes only one connecting surface 22 and is most preferably of a thin, generally C-shaped configuration. The upper and lower arms of generally C-shaped shim 10 form two diametrically located rigid shimming surfaces 20. Such a device may be easily installed around a previously loosely affixed pre-installed receptacle 50.

Figure 3:
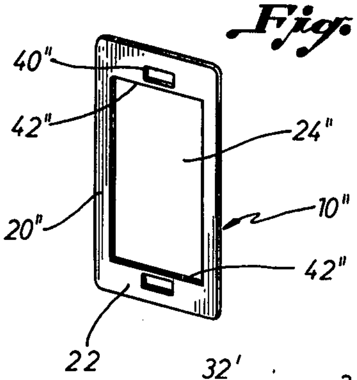
FIG. 3 is a perspective drawing of an alternative embodiment of the shim of the present invention, illustrating a shim having two connecting sides and separate openings in the shimming surfaces for the receptacle mounting means.

In another alternative embodiment of the present invention shim 10″ is further characterized by openings 40″ in shimming surfaces 20″ sufficiently large to receive therethrough mounting screws 56 or other attaching means of electrical receptacle 50. An alternative embodiment incorporating this feature is illustrated in FIG. 3. In this embodiment the interior edges 42″ of shimming surfaces 20″ and connecting surfaces 22″ define a central opening 24″ sufficiently large to permit passage of the main body of electrical receptacle 50 but not of mounting arms 52 when shim 10" and receptacle 50 are positioned in substantially parallel alignment.

In use, a shim 10, constructed according to the present invention, having side opening 26 and being generally C-shaped, is easily employed with electrical receptacle 50 or the like which have been loosely pre-installed, although not tightly secured in an outlet box 60. The method of using such shims 10 comprises adjusting the mounting means, such as mounting screws 56, of receptacle 50 or the like so that a shim 10 may be fitted between the mounting arms 52 of receptacle 50 and the exposed surface of wall 80. An appropriately shaped shim 10 having a side opening 26 is selected from the shims described above. Such a shim may be easily and conveniently inserted between mounting arms 52 and the exposed surface of wall 80, by passing the main body of receptacle 50 through side opening 26 and into central opening 24. When so arranged at least a portion of mounting prongs 52 including breakaway tabs 54 contacts a portion of shimming surfaces 20. In the more preferred embodiments having concave interior edges 28 on shimming surfaces 20 a larger shimming surface is available while providing an easily adjusted and positioned shim 10. Finally, the mounting means, such as mounting screws 56, are adjusted to securely and firmly engage shim 10 between mounting arms 52 and the exposed surface of wall 80. For aesthetic purposes cover plate 90 having receptacle openings 92 is installed with screws 94.

The foregoing description of the present invention has been directed in primary part to a particular preferred embodiment in accordance with the requirements of the patent statutes and for purposes of explanation and illustration. It will be apparent, however, to those skilled in the art that many modifications and changes in this specific apparatus may be made without departing from the scope and spirit of the invention. For example, the exact configuration of shim 10 may be altered to conform with any shape receptacle 50 and mounting means and the corresponding cover plate 90. Therefore, the invention is not restricted to the particular form of construction illustrated and described, but covers all modifications and variations which may fall within the scope of the following claims.

It is applicant's intention in the following claims to cover such modifications and variations as fall within the true spirit and scope of the invention.

What is claimed is:

1. A shim for adjusting the fit of an electrical receptacle or switch with the surrounding wall surface, comprising:

a thin, generally C-shaped shim of such shape and thickness to fit behind and be concealed by a receptacle cover or switch plate and characterized by, two diametrically located generally parallel rigid shimming surfaces, said surfaces forming the upper and lower arms of said generally C-shaped shim;

a connecting surface completing said generally C-shaped shim;

an open central portion of said generally C-shaped shim, said open portion being of sufficient size and shape to receive therethrough the main body, including diametrically located mounting screws, of said receptacle or switch, but not of sufficient size and shape to receive therethrough the entirety of said mounting arms when said shim and said receptacle or switch are positioned in substantially parallel alignment; and the interior edges of said rigid shimming surfaces being concave and including an arcuate surface having a radius of curvature of at least slightly greater than half the distance between the diametrically located mounting screws of said receptacle or switch, so that the shim may be inserted in position after the mounting receptacle or switch is at least partially installed and so that the ends of the rigid shimming surfaces are larger than the central positions thereof to provide a greater bearing surface at the ends.

2. The shim of claim 1 wherein said shimming and connecting surfaces are comprised of a single piece of rigid material.

* * * * *